United States Patent
Blanchard et al.

(10) Patent No.: US 6,824,632 B2
(45) Date of Patent: Nov. 30, 2004

(54) ULTRASONIC SEALING DEVICE, RELATED METHOD AND PACKAGE

(75) Inventors: Daniel Blanchard, Neuvy-en-Sullias (FR); Patrick Faul, Chateauneuf-sur-Loire (FR)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 10/240,034

(22) PCT Filed: Apr. 5, 2001

(86) PCT No.: PCT/FR01/01027

§ 371 (c)(1),
(2), (4) Date: Feb. 21, 2003

(87) PCT Pub. No.: WO01/74568

PCT Pub. Date: Oct. 11, 2001

(65) Prior Publication Data

US 2003/0168149 A1 Sep. 11, 2003

(30) Foreign Application Priority Data

Apr. 5, 2000 (FR) .............................. 00 04335
Apr. 6, 2000 (FR) .............................. 00 04464

(51) Int. Cl.⁷ ............................................. B29C 65/08
(52) U.S. Cl. .................... 156/73.3; 156/73.1; 156/251; 156/269; 156/308.4; 156/515; 156/580.2
(58) Field of Search ................ 156/73.1, 73.3, 156/251, 267, 269, 308.2, 308.4, 515, 530, 580.1, 580.2

(56) References Cited

U.S. PATENT DOCUMENTS

| | | | |
|---|---|---|---|
| 3,434,906 A | | 3/1969 | De Greeve et al. |
| 3,505,136 A | * | 4/1970 | Attwood .................... 156/73.1 |
| 3,657,033 A | | 4/1972 | Sager |
| 4,097,327 A | | 6/1978 | Calemard |
| 4,410,383 A | | 10/1983 | Lipari |
| 4,478,661 A | * | 10/1984 | Lewis .......................... 156/92 |
| 4,517,790 A | * | 5/1985 | Kreager ...................... 53/552 |
| 4,521,467 A | * | 6/1985 | Berger ...................... 428/40.6 |
| 4,534,818 A | * | 8/1985 | Kreager et al. ............. 156/466 |
| 4,663,917 A | * | 5/1987 | Taylor et al. ................. 53/552 |
| 4,711,693 A | * | 12/1987 | Holze, Jr. ................ 156/580.1 |
| 4,909,870 A | * | 3/1990 | Gould et al. .................. 156/66 |
| 5,632,831 A | | 5/1997 | Stull |
| 5,932,041 A | * | 8/1999 | Dolling et al. ............. 156/73.3 |
| 6,554,931 B1 | | 4/2003 | Blanchard et al. |

FOREIGN PATENT DOCUMENTS

| | | |
|---|---|---|
| AT | 382 112 | 12/1987 |
| DE | 30 34 955 A1 | 3/1982 |

(List continued on next page.)

*Primary Examiner*—James Sells
(74) *Attorney, Agent, or Firm*—Fulbright & Jaworski LLP

(57) ABSTRACT

The invention concerns an ultrasonic device for sealing at least two superimposed sheets, said device comprising a sealing assembly consisting of two elements which are respectively an anvil and a sonotrode, arranged opposite each other so that their facing surfaces form an interstice for passing through the sheets to be sealed, said interstice having an inlet section and an outlet section, the sonotrode vibrating at high frequencies to emit ultrasonic waves, characterised in that means are provided for generating between the superimposed sheets and said sealing assembly a relative movement along a specific feeding direction relative to the sealing assembly, and the section of said passage interstice decreases between its inlet section and its outlet section, and at least one element of said sealing assembly comprises a projecting ridge emerging into said passage interstice and extending along a direction globally parallel to said feeding direction. The invention also concerns a related method for sealing flexible packages, and the resulting packages.

24 Claims, 4 Drawing Sheets

FOREIGN PATENT DOCUMENTS

| | | |
|---|---|---|
| DE | 31 46 585 A1 | 6/1983 |
| DE | G 88 09 048.5 | 10/1988 |
| DE | 4126557 | 2/1992 |
| DE | 195 41 129 C1 | 10/1995 |
| EP | 0 333 390 A3 | 9/1989 |
| EP | 0 498 364 A2 | 8/1992 |
| FR | 2 665 683 A1 | 2/1992 |
| FR | 2 784 051 A1 | 4/2000 |
| GB | 952581 | 3/1964 |
| JP | 55154119 | 12/1980 |
| JP | 63315223 | 12/1988 |

\* cited by examiner

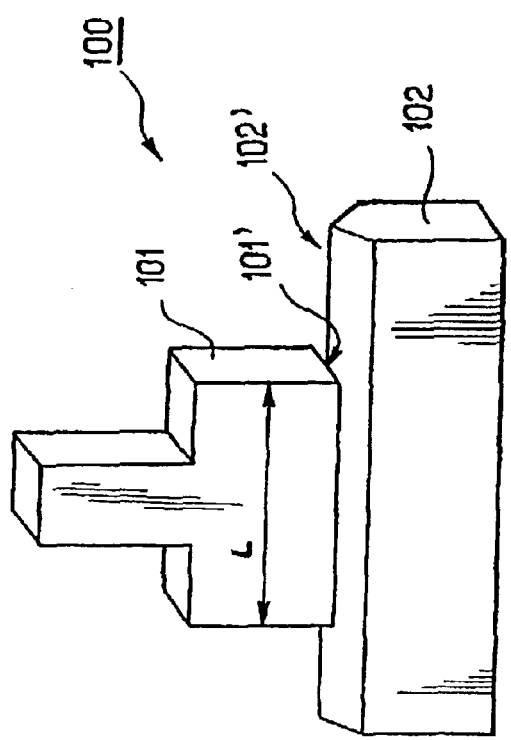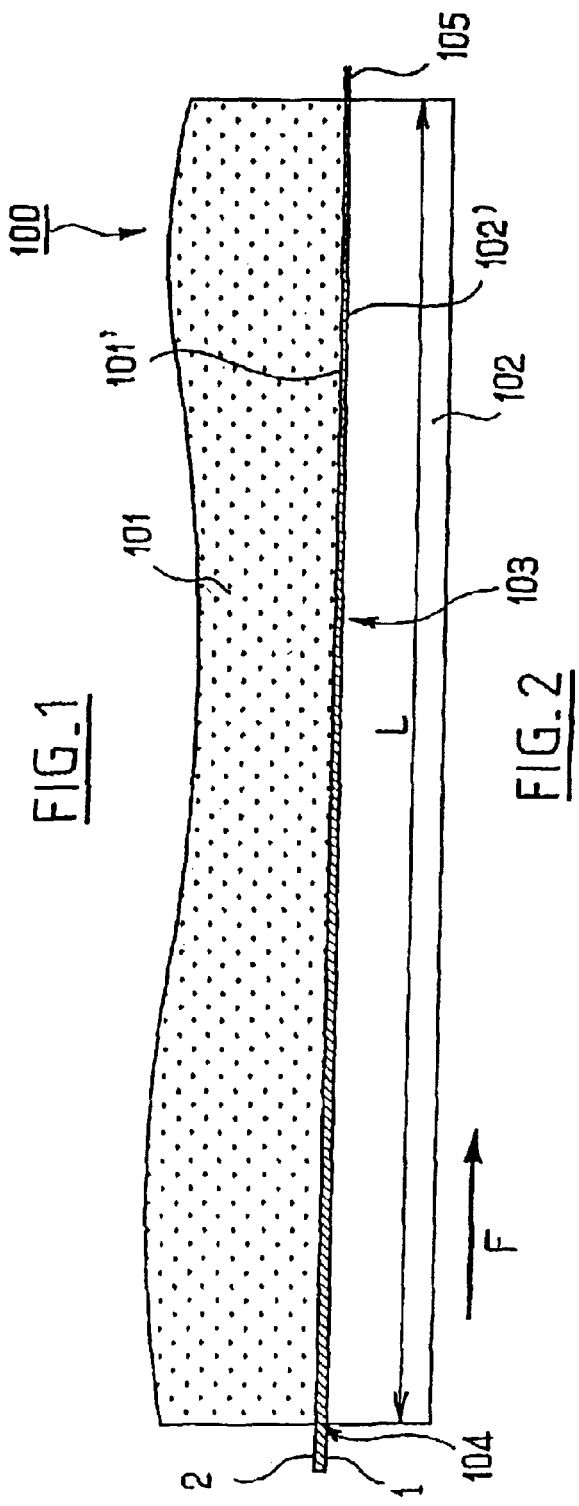

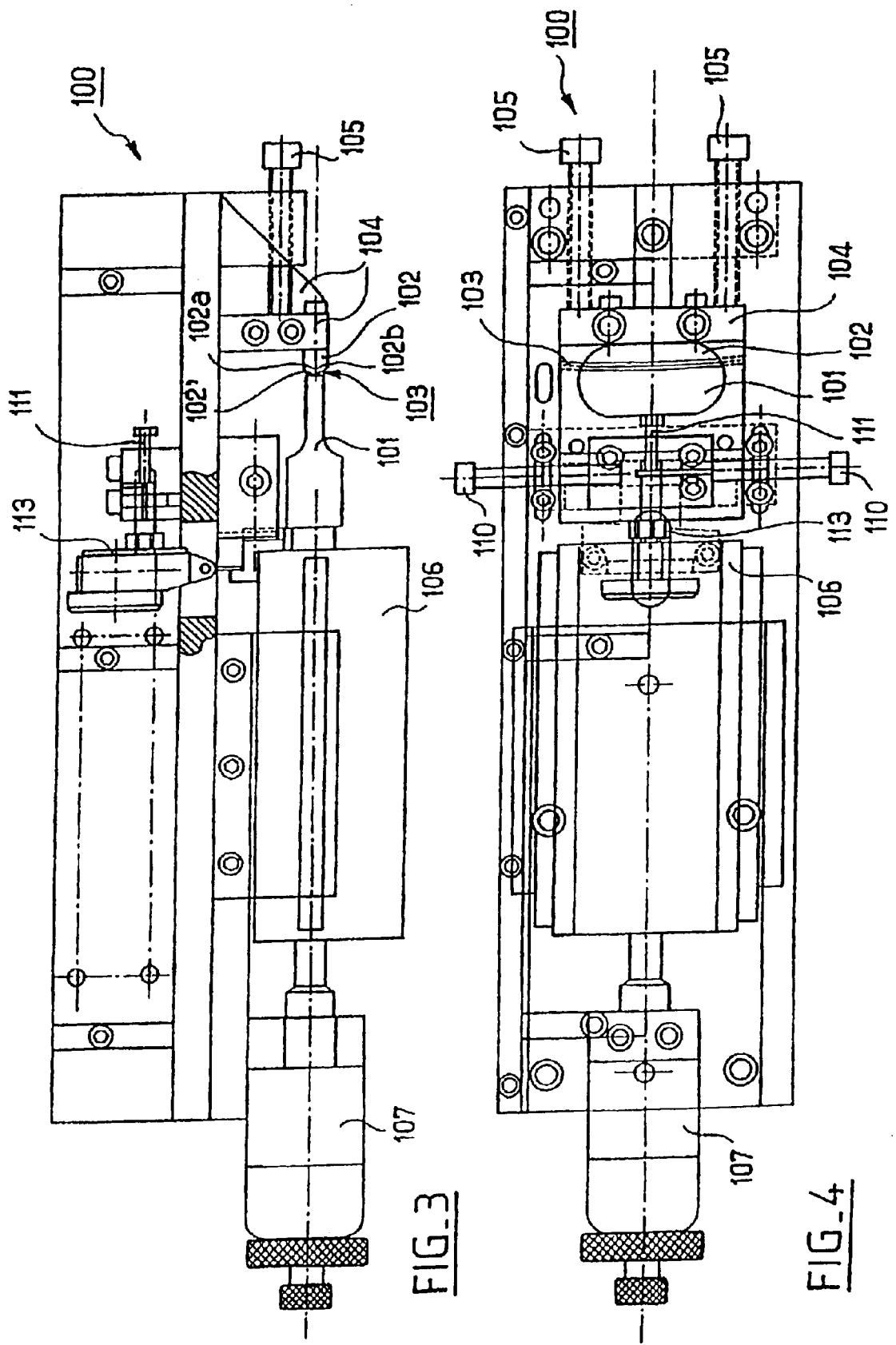

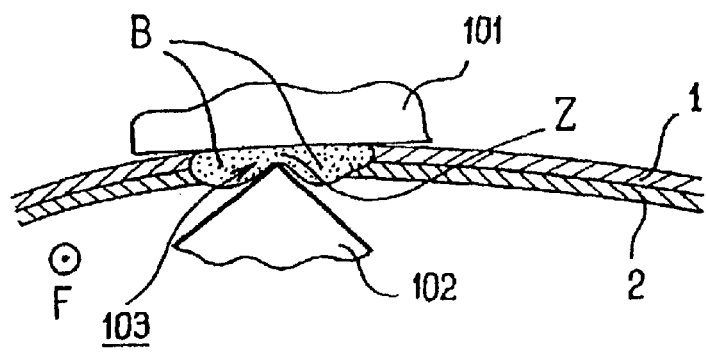
FIG_5
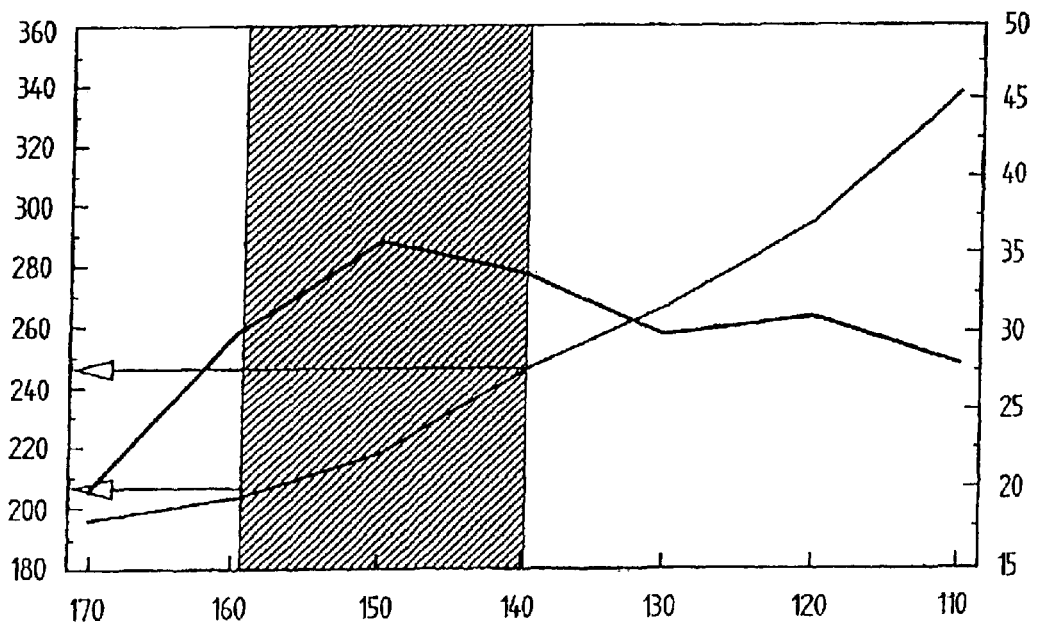
FIG_6

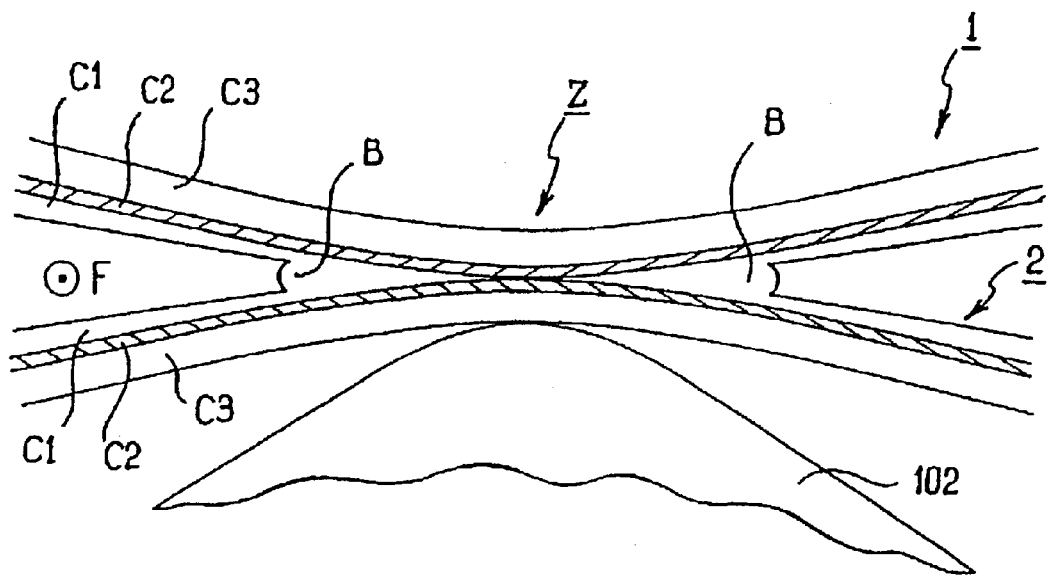
FIG_7
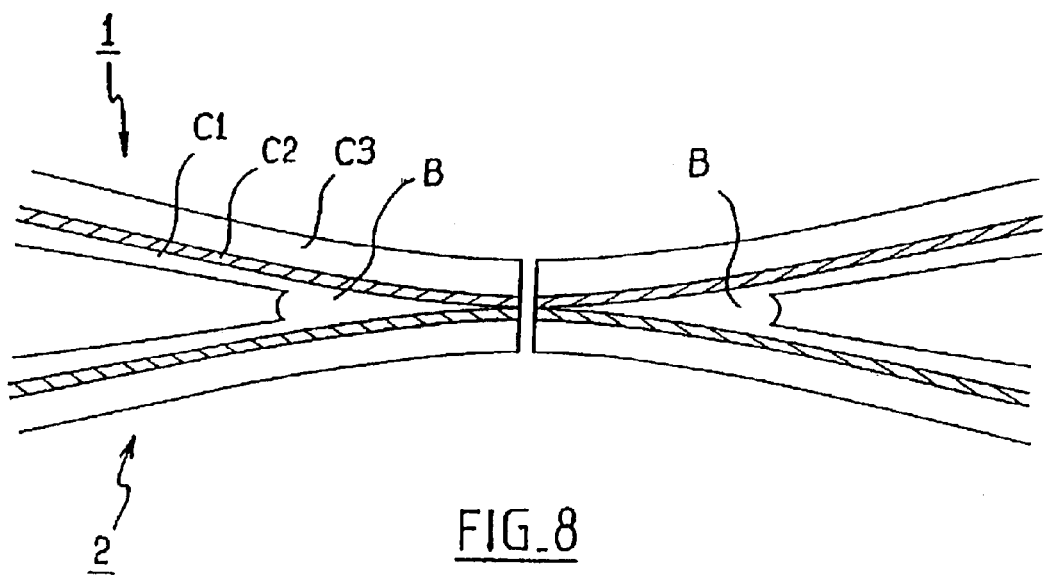
FIG_8

ULTRASONIC SEALING DEVICE, RELATED METHOD AND PACKAGE

TECHNICAL FIELD

In a general manner, the present invention concerns operations for sealing and cutting at least two superimposed flexible sheets.

BACKGROUND OF THE INVENTION

In this field, documents EP 333390 and GB-A-952581 disclose ultrasonic sealing devices between an anvil and a sonotrode oscillating at ultrasonic frequency, of at least two superimposed sheets made out of plastic material, which move continuously along a specific line.

The ultrasonic sealing devices described in these aforesaid documents have, as a common feature, an interstice for passing through two superimposed sheets to be sealed, formed between the opposite surfaces of the sonotrode and the anvil, which has a section that decreases and then increases between its input and outlet.

According to EP 333390, this configuration for the section of the passage interstice is exclusively done so that the force applied by the device to the surfaces to be sealed is homogenous along the whole length of the sealing interstice.

But nothing indicates that the configuration in EP 333390 allows the width of the seal lines to be reduced in an appreciable manner.

Moreover, the device in EP 333390 is not intended for cutting the sheets to be sealed. Instead, it is made clear that for applications of the device described in this document any cutting or perforation of the materials to be sealed is to be avoided.

Nevertheless, it has already been mentioned that it would be desirable to combine a cutting operation with the sealing of the sheets, in particular in the widespread case where one wishes to carry out, at the same time:

A cut to make the sheets of the pouch from the films that are fed through in a continuous manner.

And the sealing of the edges of the folded sheet, or the superimposed sheets, in order to make the pouch.

Thus, the device in EP 333390 does not allow the objectives of manufacturers as described above to be met in a satisfactory manner (significant reduction in the width of the seal, while at the same time allowing a high production rate and ensuring very good mechanical strength and leak tightness, as well as making it possible for a cutting operation to be carried out simultaneously with the sealing).

The same holds for the device in GB-A-952581.

In fact, quite to the contrary, as regards the width of the seal line, it is pointed out that the device described in this document is intended to maintain the seal line relatively large, by increasing the width of the contact zone between the sheets to be sealed and the device (the width of the seal line is, in the case of the device in GB-A-952581 always less than the width of the contact zone between the sheets and the device).

Furthermore, this document does not mention the possibility of carrying out a cutting operation on the sheets to be sealed.

Furthermore, EP 498 364 discloses a sealing/cutting device for sheets fed through in a continuous manner.

In this device, a cutting blade is placed downstream of the sealing sonotrode along the sheet feed direction. The sonotrode and the blade constitute two separate elements that are used, respectively, for sealing and cutting operations.

A disadvantage linked to this type of configuration is that it is very tricky obtaining a thin seal line: the cutting blade positioned downstream of the sonotrode has in fact to act on the middle of the seal line.

The seal line therefore has to be wide enough to ensure that the cutting blade does indeed act on the middle region of said line.

Besides, it is pointed out in EP 498 364 that the reduction in the width of the seal lines is not at all an objective intended for the device in this document; on the contrary, "seal lines that are wider than those obtained by conventional methods" are sought (c.f. col. 4 1. 52–54 of this document).

Furthermore, a further disadvantage of the device in EP 498 364 is that it is tricky to obtain very good symmetry in the cutting profile of the sheet; in other words, obtaining the same width of cut along both sides of the seal line. This disadvantage also derives from the fact that the seal and the cut are carried out in a sequential manner, and not simultaneously. This can lead to production irregularities.

Finally, documents exist that disclose ultrasonic devices to carry out not only sealing but also cutting of films. An example of this type of device may be found, for example, in FR 2 665 683.

However, the device described in this document does not allow films fed through in a continuous manner to be processed, and so the throughput rate is limited by the discontinuous character of the process. Furthermore, no mention is made in this document of the width of the seal lines.

BRIEF SUMMARY OF THE INVENTION

More specifically, according to a first aspect, the invention concerns a type of device that comprises a sonotrode and an anvil arranged opposite each other so that their facing surfaces form an interstice for passing through the sheets to be sealed, with an inlet section and an outlet section, the sonotrode vibrating at high frequencies to emit ultrasonic waves.

The invention also concerns, according to a second aspect, a sealing and/or cutting method employing the aforesaid device, where said method may be used to seal and if appropriate cut two flexible films or sheets.

More specifically, the advantageous applications of the method according to the invention concern:

sealing and if appropriate also cutting the two lateral edges of flexible packages using the aforesaid type of device;

sealing a packaging as described above using the aforesaid type of device.

It also concerns a flexible package produced specifically according to the aforesaid methods.

Such a package may be made from single-layer or multilayer plastic films.

An advantageous but not limitative application of the invention is the manufacture of flexible pouches or sachets containing foodstuffs, for example animal foodstuffs, where said pouches or sachets are generally intended to be hermetically sealed and heat treated after being filled and sealed (in the text that follows, both the terms "package" and "pouch" will be used indiscriminately to designate flexible packages).

Once filled, these pouches may be sterilized by heating under pressure in a humid atmosphere.

In order to be able to withstand this type of heat treatment, they are made from one or several film(s) with a specific structure.

More specifically, they are generally manufactured from one or several film(s), each film comprising an upper layer and lower layer intended to form the external and internal faces of said packages made out of plastic material, and a central layer, sandwiched between said upper and lower layers, made out of light metal.

Even more precisely, the films from which these packages are manufactured may have the following characteristics:

- the upper layer is generally a layer of polyethylene terephthalate, combined or not with a layer of polyamide;
- the central layer comprises a gas tight barrier material, in particular aluminium, and the internal layer is a layer of polypropylene combined or not with a layer of polyamide;
- between each layer, a spread coat adhesive is provided that allows the different layers to be bonded together;
- moreover, the layer of polyethylene terephthalate may be printed on its internal face in order to decorate the exterior of said pouch. In fact, the layer of polyethylene terephthalate is generally used as a printing support and determines the exterior appearance of the pouch;
- the central layer of aluminium forms a gas tight barrier, particularly to oxygen and water vapor, in order to isolate from the exterior the materials contained within the pouch;
- the polyamide layer constitutes an anti-perforation layer when this is required, depending on the subsequent applications of the pouch, and the polypropylene layer acts as a scaling agent for making the pouch, and provides the general mechanical strength of the pouch and ensures leak tightness at the level of the seals of said pouch.

Such pouches may contain solids, moist solids, liquids or even a combination of solids and liquids.

At present, such pouches have various shapes.

They may be flat, with three or four seals, or with gussets with three sides sealed and one bottom sealed in the form of a gusset.

Such pouches may also have two lateral gussets, or two gussets located at the top and bottom of the pouch with sealed lateral edges.

A widely used configuration for these pouches, due to its considerable simplicity, is the "flat" configuration in which the pouch is simply made by assembling two sheets. This type of assembly is done in two stages:

Firstly, a pouch is made leaving one side open by sealing the two sheets on three of the four sides of the pouch (which usually has a generally rectangular shape).

To make this seal, one uses a sheet folded back on itself along a line that will constitute one edge of the pouch, or even two separate sheets that are superimposed.

In both cases, the sealing of the edges of the sheets may be combined with a cutting operation in order to separate each sheet from a plastic film.

Secondly, the last side of the pouch is closed off once it has been filled: this closing off is also achieved by sealing and may be combined with a cutting operation.

In all cases, the seals must be made in such a way as to ensure:

- that the interior of the pouch has very good leak tightness not only in respect to liquids but also gases (particularly if the pouch contains liquid, moist or perishable ingredients);
- that the pouch has very good mechanical strength.

The sealing operations used to make these pouches generally involve conduction sealing technology where the edges of the sides of each pouch are brought together in order to heat the internal polypropylene layer of each side by conduction through the central aluminium layer.

The conduction sealing is followed by a cooling operation, which strengthens the seal made in this way.

The seal line obtained using this type of process is generally several millimeters wide, in order to ensure the seal is both leak tight and resistant.

However, it would be advantageous to be able to reduce the width of the seal line in order to be able to reduce the amounts of material used.

In fact, the pouches are generally manufactured in very large numbers and so it is of interest to manufacturers to look for any savings that may be made on the unit cost price of the pouches; the relatively high width of the seal line thus constitutes a first disadvantage of conduction sealing.

Moreover, the implementation of this conduction sealing process with a continuous throughput of plastic films is problematical, especially due to the friction existing between the non-moving and moving parts of the sealing device.

This type of process is therefore generally used in a discontinuous mode, on films moving in a step by step manner.

Furthermore, the principle of step by step sealing allows a limited production rate. Even if two pouches are moved forward simultaneously in each step, this process reaches its mechanical working limits, notably due to the fact that the pouches have to be slowed down and then speeded up before and after the sealing unit, and the system has a certain inertia.

In order to increase the sealing rate of such packages or pouches and, for example, go from a rate of 120 packages/minute (present limiting rate for heat sealing processes) to a much higher rate (of around 500 packages/minute if not more), it has been suggested using a ultrasonic sealing device with a continuous throughput of packages.

BRIEF DESCRIPTION OF THE DRAWINGS

The description that follows with reference to the appended drawings, given as non-limitative examples, will make the purpose of the invention and how it can be implemented clear.

In the appended drawings:

FIG. 1 is a schematic perspective view of the sonotrode and the anvil of the ultrasonic sealing device according to the invention.

FIG. 2 is a detailed schematic longitudinal cross sectional view of the ultrasonic device according to the invention, on a scale of 10.

FIGS. 3 and 4 are schematic side and top views of the ultrasonic sealing device according to the invention, according to a first embodiment that is particularly well suited to an application for sealing pouches whose lateral edges have already been assembled.

FIG. 5 is a schematic transversal sectional representation of two superimposed films fed into a device according to the invention in order to be sealed together and, if necessary, cut.

FIG. 6 is a graph showing the change in a mechanical strength characteristic of a pouch made according to the invention, as a function of the change in the parameters of the method according to the invention.

FIG. 7 is a cross sectional schematic view of two multi-layer films sealed according to the invention.

FIG. 8 is an equivalent view to that of FIG. 7, in which the two films have been cut.

DETAILED DESCRIPTION OF THE INVENTION

The aim of the invention is to allow the aforementioned disadvantages to be overcome.

In order to achieve this aim, the invention proposes, according to a first aspect, an ultrasonic device for sealing at least two superimposed sheets, said device comprising a sealing assembly consisting of two elements which are respectively an anvil and a sonotrode, arranged opposite each other so that their facing surfaces form an interstice for passing through the sheets to be sealed, said interstice having an inlet section and an outlet section, the sonotrode vibrating at high frequencies to emit ultrasonic waves, characterized in that means are provided for generating between the superimposed sheets and said sealing assembly a relative movement along a specific feeding direction relative to the sealing assembly, and the section of said passage interstice decreases between its inlet section and its outlet section, and at least one element of said sealing assembly comprises a projecting ridge emerging into said passage interstice and extending along a direction globally parallel to said feeding direction.

Preferred but not limitative aspects of the device according to the invention are as follows:

said projecting ridge is formed on the anvil;

the surface of the anvil opposite the sonotrode has a pointed profile formed by the inclined planes that form a sharp angle between them;

said sharp angle is around 140 degrees;

the opposite faces of the anvil and the sonotrode are generally flat;

the inlet section of said passage interstice is bigger than the outlet section of said interstice by a factor of between around 1.2 and 2;

means are provided to feed through the sheets and the sealing assembly is fixed;

the sealing assembly is mounted on a mobile carriage so that it can be moved in relation to the sheets along a desired sealing direction;

a ram or a counterweight in combination with the sonotrode is provided so that it can exert a specific pressure of between $0.2.10^5$ and $6.10^5$ Pa on the sheets to be sealed;

means for increasing the specific pressure are provided so that the device cuts the sheets in combination with the sealing;

the throughput rate of the sheets in relation to the sealing assembly is between 50 and 150 m/min., preferably between 60 and 80 m/min.

According to a second aspect, the invention provides a method for sealing flexible packages, characterized in that the aforesaid device is used to seal two flexible sheets in order to form the sides of the package.

Preferred but in nowise limitative aspects of the method according to the invention are as follows:

the passage of the sheets in said passage interstice causes creep in the sheet material on each side of said ridge;

said creep creates on each side of said ridge a creep bead that constitutes a primary sealing line;

simultaneously with the sealing of the sheets, said sheets are cut;

when cut, the sheets advance continuously in relation to the sealing assembly;

before sealing, the sides of the package are heated in order to soften the internal faces of each side;

the sides of the package are made up of a flexible sheet comprising a central layer of gastight material between two layers of plastic material;

the central layer comprises aluminium;

during sealing, the respective internal layers of the two sheets facing opposite each other fuse together, and the respective central layers of the two sheets come into contact with each other;

the internal layer of each sheet comprises polypropylene.

According to a third aspect, the invention proposes a flexible package, comprising two parts of sheet opposite each other, characterized in that the parts of sheet are sealed using a method as described above.

Preferred but in nowise limitative aspects of the flexible package according to the invention are as follows:

it may be obtained by a method in accordance with any of the aforesaid aspects, used to make at least one seal along a seal line, characterized in that the width of said seal line is around 1 millimeter;

the central layers of the sides of the package that are in contact with each other form a gastight barrier;

the level of air leakage from the package is around $2.4.10^{-4}$ cm$^3$/day.

In the figures, we have schematically represented an ultrasonic sealing device 100 for at least two superimposed sheets 1, 2 made out of plastic material, for example polypropylene, which are fed in a continuous manner along a given direction F.

In this respect, the device comprises means for feeding through the sheets. Such means may be known means and will not be detailed further.

It should be pointed out that although the examples that are described in detail below relate to pouches made simply from two sheets 1 and 2, the invention also has particularly advantageous applications in the production of pouches from multi-layer films of the type mentioned above (layer of aluminium between two plastic layers).

The device 100 comprises a sonotrode 101 that vibrates at high frequency to emit ultrasonic waves, and an anvil 102.

The sonotrode 101 and the anvil 102 are arranged opposite each other so that their facing surfaces 101', 102' form an interstice 103 for passing through two superimposed sheets to be sealed 1, 2, said interstice passage having an inlet section 104 and an outlet section 105.

In the example shown in FIGS. 3 and 4, the sonotrode 101 and the anvil 102 extend along a generally horizontal direction and the superimposed sheets to be sealed are intended to be fed along a generally vertical plane Obviously, according to an embodiment not shown, the sonotrode and the anvil may be arranged vertically with the superimposed sheets moving along in a horizontal plane.

The height of the inlet section 104 of the passage interstice 103 is slightly greater than the sum of the thicknesses of the superimposed sheets to be sealed 1, 2. Here, the thickness of the superimposed sheets to be sealed is around 200 µm and the height of the inlet section 104 is around 220 µm. This allows the sheets to be sealed to easily enter into the passage interstice provided between the sonotrode and the anvil of the ultrasonic sealing device.

According to a first particularly advantageous characteristic of the ultrasonic sealing device 100, the opposite surfaces 101', 102' of the sonotrode 101 and the anvil 102 converge towards each other in such as way that the section of said passage interstice 103 continuously decreases between its inlet section 104 and its outlet section 105 (see, in particular, FIG. 2).

In a preferred embodiment, the surfaces 101' and 102' comprise flat surfaces, and the anvil 102 is fixed.

According to the specific example described, the inlet section 104 of the passage interstice 103 is greater by a factor of around 1.3 than the outlet section 105 of said interstice 103.

Thus, the height of the outlet section 105 of said interstice 103 is here around 170 μm. This height of 170 μm gives a sealing thickness by the sealing device of around 135 μm.

With the superimposed sheets 1, 2 fed along at constant speed, the passage interstice 103 formed between the sonotrode 101 and the anvil 102 has a specific length L as a function of the specific speed, constant or variable, at which said sheets are fed along, with a contact time of the vibrating sonotrode and the anvil 102 with said sheets 1, 2, chosen in order to obtain leak tight sealing between the sheets over a specific sealing length.

According to the example shown, the speed at which said sheets are fed along is constant and around 62.5 m/min, which gives an interstice passage length of around 75 millimeters, with a contact time of 72 ms and a sealing strip width of around 1 millimeter.

As FIG. 3 more specifically shows, and according to another essential characteristic of the invention, the surface 102' of the anvil 102 opposite the sonotrode 101 has a profile in the form of a point formed by the inclined faces 102a, 102b forming a sharp angle between them. Here, the angle formed between the inclined faces 102a, 102b is around 140 degrees. This angle may in any event be within a range extending from 120 to 160 degrees.

In this way, the faces 102a, 102b of the anvil and the flat surface of the sonotrode that are opposite each other here form an angle of around 20 degrees.

Thus, by means of such a sealing device, a contact zone that corresponds essentially to the ridge line of the anvil is formed between the sheets to be sealed and the sealing device (and more particularly the anvil and the sonotrode).

Moreover, the contact zone is extremely narrow (less than one millimeter wide, the point of the profile of the anvil having in reality a curve radius of less than 1 millimeter, for example 0.5 millimeters or preferably 0.25 millimeters).

As a consequence, the sealing line in the two superimposed plastic material sheets, which is around 135 μm thick, is around 1 millimeter thick, which represents considerable progress compared to the performance of known devices.

It is important to note that the configuration of the sealing device according to the invention, comprising the combination:
of a converging interstice 103, which, in the example described above, is formed by the flat surfaces of the anvil and the sonotrode;
and the pointed profile of the surface 102' of the anvil, in order to form a sharp ridge is particularly advantageous.

In fact, this configuration allows the sheets 1, 2 to be sealed to pass into the interstice 103, said sheets being fed along continuously in relation to the anvil and the sonotrode, and to make, opposite the ridge line of the anvil, a very narrow width seal in the sheets.

More precisely, and as shown in FIG. 5 (in which, as in FIG. 1, the angles and dimensions are not to scale as this figure only illustrates the principle of the invention), the combination of the convergence of the generally flat surfaces of the sonotrode 101 and the anvil 102, with the pointed profile of this anvil, does not only enable the sheets 1 and 2 that are fed continuously along the direction F in relation to the anvil and the sonotrode to be sealed.

In fact, due to the shape of the anvil, the orientation of the ridge of this anvil parallel to the direction of the relative movement between the films to be sealed, and the distance between the anvil and sonotrode (the amplitude of the oscillations of the sonotrode are set so that the sonotrode can move very near to the anvil at the end of the oscillation, and even to come flush with the anvil for the application of the cut combined with the sealing), the material of the films 1 and 2 is forced back on the sides and undergoes creep on each side of the contact zone Z, which is located at the middle of the passage interstice 103.

The creep thus creates, on each side of the contact zone Z, a bead B within which the materials that make up the sheets 1 and 2 mix together and constitute an amalgam, which creates an extremely strong bond.

Thus, the seal line between the films 1 and 2 comprises the two beads B that stretch out longitudinally on the films, with each of these beads constituting in itself a primary seal line.

The applicant has carried out tensile strength tests on two sheets sealed together using this technique; these results are shown in FIG. 6.

More precisely, this figure shows, in Newtons, on the right y-axis the tension N corresponding to the rupture of the mechanical bond between the two sealed sheets (thick curve line), and on the x-axis the reference height of the interstice 103 (in other words, the distance between the point of the anvil and the face 101' of the sonotrode when said sonotrode is in its reference position around which it oscillates), in microns.

The results in FIG. 6 show that the breaking strength levels are completely satisfactory, around 20 to 35 Newtons, or even more. These results also show that there is a range of values for the reference height of the interstice 103 (between 140 and 160 microns in the case described) for which the breaking strength N is high, reaching a maximum at a height of 150 microns.

The left y-axis, for its part, shown the power in Watts consumed by the sealing device (thin curve line). This power increases from 200 Watts to 340 Watts when the reference height decreases from 170 to 110 microns.

A creep result described above is obtained when the width of the seal zone, demarcated by the two beads B, is, as has been said, only around one millimeter (the width of each bead is markedly less than one millimeter).

Another result of this configuration, and of the associated creep that provokes the aforesaid amalgam, is the very good quality of the seal made at the level of each bead in terms of leak tightness and mechanical strength, in combination with the very small width of the seal lines that correspond to the beads.

More specifically, the applicant has carried out air tightness test on pouches whose sheets, each made up of three layers including a central aluminium layer, were sealed by the method described above.

The results have shown that the leak tightness of the pouches obtained thereof was greater than the normally sought for values by a factor of 10, and the level of measured air leaks was around $2.4 \ 10^{-4}$ centimeters cube of air per pouch and per day (for a pouch whose four sides have been sealed in this way).

And it will be seen that this method may be used on continuously moving films, allowing an output of around 500 pouches/minute or more for the sealing, and a throughput speed in relation to the device of around 25 m/minute for cutting applications.

It will also be seen that, due to the fact that the interstice 103 is formed by two flat walls (respective flat surfaces of the sonotrode 101 and the anvil 102), the reduction in the height of said interstice is entirely regular. This favors the application of the invention to films fed along at high speed, and allows production speeds to be increased.

Another advantageous effect of this geometrical configuration, where the opposite faces of the anvil and the sonotrode are flat, is that the length of the contact zone between the anvil and the sonotrode is considerably increased, compared to known configurations where either the anvil or the sonotrode are not flat (for example, circular anvil that only allows a contact zone with a limited length between the anvil and the sonotrode to be obtained).

This allows a seal and, if appropriate, a cut to be made in a progressive manner, which is also a factor that allows the throughput speed of the films to be increased. And compared to a configuration where the anvil is circular and set up in a rotary configuration to accompany the throughput of the film, the configuration according to the invention has the advantage of requiring a lot less setting and adjustment of any play, since the only moving part in the device is the sonotrode.

In place of a pointed profile formed by two flat surfaces that form a straight edge, the anvil may have any projecting profile that forms a sharp edge, since the contact zone between the sheets and the device is very narrow, around a tenth of a millimeter, and since the following combination is present:

convergence of the interstice along the feed direction of the sheets; and existence of a projecting ridge on the anvil It is also possible to form in a converging interstice 103 a narrow contact zone along a ridge not associated with the anvil 102 but with the sonotrode, where the face(s) of the anvil directed towards the sonotrode can have a flat shape, or any other shape. It is also possible for both the anvil and the sonotrode to have projecting profiles.

Nevertheless, it is preferable for the anvil, and only the anvil, to have a projecting ridge profile, since it is known that the face of the films that is directed towards the sonotrode is the face that undergoes the most mechanical stresses due to the vibration of the sonotrode. And in order to avoid damaging the films that are sealed, it is preferable for only the anvil to have a projecting profile.

The sonotrode 101 vibrates at a frequency of between approximately 20 and 40 KHz and, for the sealing, at an amplitude of between 10 and 100 microns, and preferentially around 70 microns.

Adjustment screws 110 are provided that make it possible to adjust the position of the sonotrode in relation to the anvil in the horizontal plane. A comparator 113 is also provided, which enables the interstice between the anvil 102 and the sonotrode 101 to be adjusted.

Moreover, the adjustment screws 105 make it possible to adjust the angle between the sonotrode 101 and the anvil 102.

This adjustment system makes it possible to adjust the relative positions of the sonotrode and the anvil, and thus the height of the input and outlet sections of the interstice for passing said sheets, as a function of the thickness of said sheets to be sealed.

Advantageously, this ultrasonic sealing device 100 enables superimposed sheets made out of plastic material, moving at a speed of between 50 and 100 m/min, and preferentially between 60 and 80 m/min, to be sealed.

According to another aspect of the invention and more specifically with reference to FIGS. 7 and 8, the ultrasonic sealing device described above in reference to sealing two films 1 and 2 may advantageously be used to manufacture and/or seal packages with two sides linked by their lateral edges, each side comprising internal and external faces in plastic material and a central layer made out of light metal sandwiched between the two internal and external faces.

According to a sealing method in accordance with the invention, the packages move along on a bed and are laid vertically one after the other, which means here that the sonotrode and the anvil are in the horizontal position as shown in FIGS. 3 and 4.

Using the sealing device 100, at the level of the upper edges of the sides of each package moving at a specific speed, either constant or variable, the internal sides of each package are ultrasonically sealed, along a seal line that stretches at least along the major part of the width of each package and, in particular, over the width of the pouch.

The packages used here are such that the central layer C2 of each of their sides 1, 2 is made out of aluminium, the internal face of each of their sides comprises a layer C1 of polypropylene or a layer of polyamide and a layer of polypropylene, and the external face of each of their sides comprises a layer C3 of polyethylene terephthalate, possibly covered with an additional layer of polyamide.

The external layer is intended to act as a support for a decorative motif.

The ultrasonic sealing device as described in referring to FIGS. 1 to 4, enables the internal sides of each package to be sealed through the external face and the central layer.

In fact, the melt temperature of polypropylene is lower than the melt temperature of the layer of the external face and under the action of the oscillations of the sonotrode, the particles making up the internal layer are excited, which melt to form the beads B.

In this way, one creates not only a bead arising from the melting of the internal layers that are in contact with each other but also the aluminium layers of the two sides are brought into contact, which makes it possible to obtain very good leak tightness properties as described above (see FIG. 7).

It should be noted that it is possible, according to the invention, to adjust the level of energy transmitted to the films 1 and 2 so that only the internal layers C1 made out of polypropylene melt and form on each side of the anvil 102 (which is in FIGS. 7 and 8 shown in a schematic form in order to illustrate the principle of the invention, with the sonotrode not shown in these figures) a bead B arising from the creep of layers C1 of the two films 1 and 2.

In this case, the layers C2 in aluminium of films 1 and 2 come into contact with each other so that they form a gastight barrier.

The external layers C3 are not altered by the sealing, since the melt temperature of polyethylene is higher than that of polypropylene.

By increasing the pressure applied by the sonotrode to the multi-layer films 1 and 2, one can, as shown in FIG. 8, make a cut at the level of the contact zone Z at the same time as the sheets are sealed.

In this case, the beads B formed between the layers C1 of polypropylene of each film ensure the cohesion of the edges thus cut and sealed, as well as the leak tightness of this seal (the layers C2 made out of aluminium are integral with the beads B and maintained in contact with each other).

As has been described previously, the seal line of each package has a thickness of around 135 $\mu$m and a width of around one millimeter.

Moreover, advantageously, thanks to the oscillations of the sonotrode against the sheets to be sealed, one can if necessary make any particles of food matter that can remain at the point where the seal has to be made disappear, and thus obtain a leak tight seal in said package.

Such a device also allows each package moving at high speed to be sealed at the sealing unit without damaging the external and central layers of these packages.

According to an advantageous characteristic of the method according to the invention, in order to accelerate the sealing process of the sides of each package, one can arrange, prior to the ultrasonic sealing of each package, to heat each side of each package in order to soften the internal faces of the sides of each package. This enables a leak tight seal to be obtained in the films with more flexibility as regards the relative positions of the anvil and the sonotrode.

The heating may be carried out, for example, by conduction or steam injection.

Moreover, the interstice between the anvil and the sonotrode and the pressure exerted between the sonotrode and the anvil on the sides of each package to be sealed (via a ram control associated with the sonotrode) may be adjusted, so that when the seal lines in each package are made, a cutting line is also made. This aspect will be detailed below.

According to other characteristics of the ultrasonic sealing device, as shown more specifically in FIGS. 3 and 4, the sonotrode 101 is mounted on a support 106 connected to a ram 107 that acts on the sonotrode in such a way that it exerts on the sheets to be sealed 101 a specific pressure of between $0.2 \cdot 10^5$ and $6 \cdot 10^5$ Pa.

According to the process described, two sealing devices as shown in FIGS. 1 to 4 may also be envisaged arranged along the feeding direction of the packages, at a given distance and at different heights or at the same height so that a single seal line is made or two side by side seal lines are made on the sides of each package (one seal line below another).

Moreover, advantageously, using the ultrasonic sealing device, the quality of the sealing or the presence of undesirable particles in the sealing zone of each package may be detected, thanks to the detection of the power consumption of the sealing device, used as a detection signal.

This type of sensed signal may be processed to identify and eject any defective packages, in other words those not sealed in a leak tight manner.

According to this process, it is possible to seal around 500 pouches per minute, which represents a considerable saving in the production cost of these pouches.

Moreover, the method for sealing the pouches using the device according to the invention makes it possible to obtain a leak tight seal on the sides of the pouches that are fed through. This is confirmed by Table 1, which shows the results of a biotest carried out on pouches sealed according to the method in compliance with the invention using several embodiments of the device according to the invention.

TABLE 1

| POUCH SPEED (m/minute) ⇔ 50 pouches/ minute | Length (millimeters) of the sealing interstice of the device according to the invention | CONTACT TIME Sonotrode/anvil of the device according to the invention | BIOTEST RESULTS % pouches leak tight to bacteria |
| --- | --- | --- | --- |
| 62.5 | 25 | 24 ms | 73% |
| 62.5 | 35 | 34 ms | 92% |
| 62.5 | 75 | 72 ms | 100% |

Obviously, the application to the sealing of pouches described above is in nowise limitative, since the invention concerns, in a general manner, the sealing of flexible films for other applications than simply the sealing of pouches.

Moreover, the aforesaid device may advantageously be used not only for sealing the sheets of the pouch, but also for cutting the sheets at the same time.

In the case where cutting is combined with sealing, the level of pressure applied to the sheets will be set at around $6 \cdot 10^5$ Pa, and the height of the interstice 103 reference may be reduced, preferably to a value less than 50 microns, for example 20 microns.

In this case, the half amplitude of the vibrations of the sonotrode is adjusted to a value that is very slightly less (around a tenth of a micron) than the height of the reference interstice, so that the sonotrode barely touches the anvil at the end of the travel.

This application is advantageous since it makes it possible to make, on each side of the cutting line, which is opposite the edge of the anvil, a primary seal line that corresponds to the width of the bead, this width being, as has been stated, markedly less than one millimeter.

Thus, in the case of sealing/cutting, the width of the seal lines is markedly less than one millimeter.

Furthermore, the results of tests carried out by the applicant on pouches whose edges were sealed and cut according to the invention, so that the sides of the pouch were only sealed by the primary seal line of a bead, were similar to those carried out on pouches sealed but not cut.

We described above (more specifically in referring to FIGS. 3 and 4) an embodiment of the invention in which the top of the continuously moving pouches is sealed, the lateral edges of said pouches having previously been sealed between themselves.

It is also possible to apply the invention to films moving continuously in a same direction F, at the same speed, to make a seal and if necessary a cut, along any desired direction in relation to the feed direction F of the films, for example the direction perpendicular to this direction F.

To do this, an assembly made up of a sonotrode and an anvil according to the configuration described above (converging surfaces to form the interstice 103, ridge of the anvil) are placed on a mobile carriage, with the whole assembly being able to move in such a way that the films move between the sonotrode, which oscillates, and the anvil.

In this case, the assembly comprising the sonotrode and the anvil is orientated in such a way that the input and outlet sections that demarcate the interstice 103 are aligned along the direction of movement of the films to be sealed in relation to said assembly. Thus, the walls of the interstice 103 diminish when a line parallel to this direction is made.

The movement of the carriage is, in this case, controlled in order to alternate between:

sealing (and possibly cutting) sequences, during which the carriage leaves a start position and is given a movement combining a move forward parallel to the direction F, at the same speed as the films, that it maintains through the whole sequence, and a move along the desired sealing direction. This second component of movement may, or may not be, along a straight line;

repositioning sequences, during which the carriage returns to the start position ready to start a new sealing sequence.

The carriage can thus go back and forth along a line forming an angle of between 0 and 90° in relation to the direction F, the speed of the carriage being adjusted during the return sequences to reposition itself at the start point in time to work again on the films with the desired distance in relation to the preceding seal line that has been made.

It is also possible to have two or several carriages, with some carrying out a sealing sequence while others return to the desired start points.

In the case where the pressure of the sonotrode is adjusted in order to simultaneously carry out a cut with the sealing, one thus obtains sheets from the cut along the cutting lines corresponding to the contact zone between the device and the films, said sheets being sealed between them by their lateral sides due to the creep of the material making up the films on each side of each cutting line.

It is also possible to only place one sonotrode on each carriage, and to provide under the moving films at least one fixed anvil with a pointed profile and whose edge is orientated along the direction followed by the carriage during its sealing/cutting sequence so that the sonotrode carried by the carriage co-operates with the edge of the anvil.

The present invention is in nowise limited to the embodiments described and represented, but those skilled in the art will be able to bring about any variants that they wish.

In particular, it is not obligatory for the sheets to be sealed and, if necessary, cut to be fed along continuously; any embodiment in which a relative movement is established between the sheets (which must always have, for their part, a synchronized movement in relation to each other) and the sealing device (assembly comprising the anvil and the sonotrode) falls within the scope of the present invention.

In the same way, the invention is in nowise limited to the application to pouches containing foodstuffs for animals; it also covers pouches or sachets that use sachets made out of sheets of plastic material and intended for other applications, particularly the packaging of foodstuffs such as sweets or freeze-dried coffee.

What is claimed is:

1. An ultrasonic device for sealing at least two superimposed sheets, said device comprising:
    a sealing assembly consisting of two elements which are respectively an anvil and a sonotrode, arranged opposite each other so that their facing surfaces form an interstice for passing through the sheets to be sealed, said interstice having an inlet section and an outlet section;
    the sonotrode vibrating at high frequencies to emit ultrasonic waves;
    wherein means are provided for generating between the superimposed sheets and said sealing assembly, a relative movement along a specific feeding direction relative to the sealing assembly;
    the section of said passage interstice decreasing between its inlet section and its outlet section; and
    at least one element of said sealing assembly comprising a projecting sealing ridge emerging into said passage interstice and extending along a direction globally parallel to said feeding direction.

2. The device according to claim 1, wherein said projecting ridge is formed on the anvil.

3. The device according to claim 1, wherein the surface of the anvil opposite the sonotrode has a pointed profile formed by inclined planes that form between them a sharp angle.

4. The device according to claim 3, wherein said sharp angle is around 140 degrees.

5. The device according to claim 1, wherein the facing surfaces of the anvil and the sonotrode are generally flat.

6. The device according to claim 1, wherein the inlet section of said passage interstice is greater than the section of said interstice outlet section by a factor of between around 1.2 and 2.

7. The device according to claim, 1 wherein means are provided for feeding through the sheets and the sealing assembly is fixed.

8. The device according to claim 1, wherein the sealing assembly is mounted on a mobile carriage so that it can be moved in relation to the sheets along a desired sealing direction.

9. The device according to claim 1, further including a ram or a counterweight combined with the sonotrode so that it exercises a specific pressure of between $0.2.10^5$ and $6.10^5$ Pa on the sheets.

10. The device according to the claim 9, wherein means for increasing the specific pressure are provided so that the device cuts the sheets in combination with the sealing.

11. The device according to claim 1, wherein the throughput speed of the sheets in relation to the sealing assembly is between 50 and 150 m/minute, and preferably between 60 and 80 m/minute.

12. A method for sealing flexible packages, comprising the use of a device conforming to claim 1, wherein two flexible sheets are sealed in order to form the sides of a package.

13. The method according to claim 12, wherein the passage of the sheets in said passage interstice causes creep in the sheet material on each side of said ridge.

14. The method according to claim 13, wherein said creep creates a creep bead B, which constitutes a primary sealing line, on each side of said ridge.

15. The method according to claim 12, wherein simultaneously with the sealing of the sheets, said sheets are cut.

16. The method according to claim 15, wherein during the cutting, the sheets advance continuously in relation to the sealing assembly.

17. The method according to claim 12, wherein before sealing, the sides of the package are heated in order to soften the internal faces of each side.

18. The method according to claim 12, wherein the sides of the package are made up of a flexible layer comprising a central layer of gastight material between two layers of plastic material.

19. The method according to claim 18, wherein the central layer comprises aluminium.

20. The method according to claim 18, wherein during sealing, the respective internal layers of the two sheets arranged opposite each other fuse together, and the respective central layers of the two sheets come into contact with each other.

21. The method according to claim 20, wherein the internal layer of each sheet comprises polypropylene.

22. A flexible package comprising two parts of sheet arranged opposite each other, wherein the parts of sheet are sealed by a method according to claim 12.

23. The flexible package of claim 22, wherein at least one seal along a seal line has a width of around one millimeter.

24. The method of claim 18, wherein a flexible package is formed in which the central layers of the sides of the package that are in contact with each other constitute a gastight barrier.

* * * * *